Aug. 16, 1960 K. T. PARSELL 2,949,018
CABINET FOR MERCHANDISING PACKAGES OF FROZEN FOOD
Filed Oct. 18, 1955 2 Sheets-Sheet 1

INVENTOR
Kendrick T. Parsell
BY
Kenyon & Kenyon
ATTORNEYS

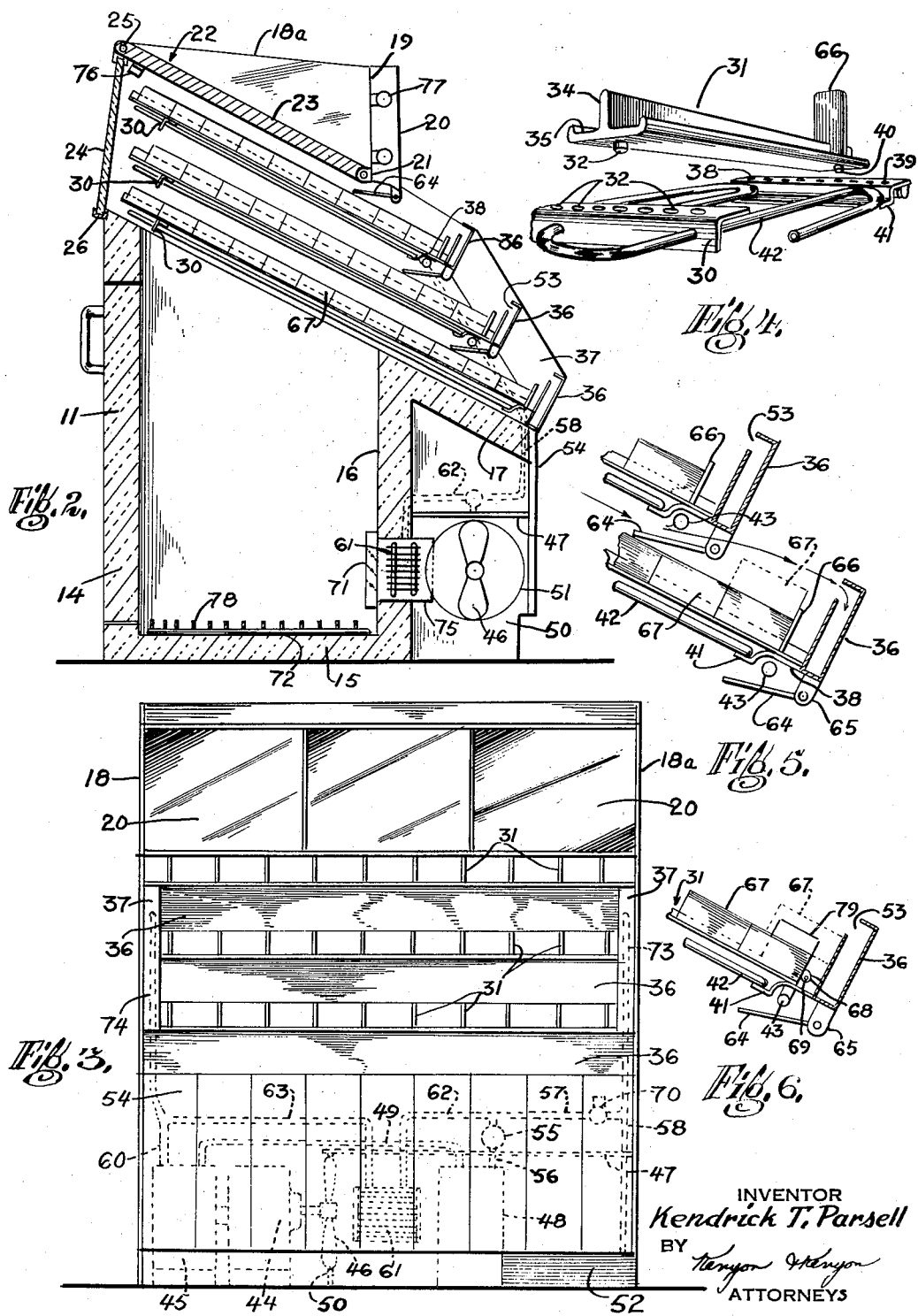

United States Patent Office 2,949,018
Patented Aug. 16, 1960

2,949,018
CABINET FOR MERCHANDISING PACKAGES OF FROZEN FOOD

Kendrick T. Parsell, 57 Sunset Drive, Manhasset, N.Y.

Filed Oct. 18, 1955, Ser. No. 541,241

9 Claims. (Cl. 62—251)

This invention relates to cabinets for merchandising packages of frozen food.

During recent years there has been a constantly increasing sale of packaged food in frozen condition. It has heretofore been the conventional practice merely to place the packages of frozen food in a large container which usually is rectangular and open at the top, suitable refrigerating means such as the refrigerating coils associated with a mechanical refrigerating unit or a refrigerant such as solid carbon dioxide being employed to keep the contents of the compartment at a low temperature. While such a cabinet may be covered between store closing at the end of a shopping day and the next store opening in order to conserve the amount of refrigeration required, it is general practice to leave the compartment open during shopping hours. The packages of frozen food are placed on the floor of the compartment in piles and the extent of the display that is possible with such a cabinet is confined to the extent of the tops of the piles of packages. To make a selection, a purchaser must lean over and look down into the cabinet to see the packages and make his selection, and if he wishes to pick up a package the cabinet design must be such as to enable the purchaser to reach in and grasp a package near the bottom-back portion of the cabinet. This places an undesirable limitation on the size of the cabinet and the extent of the display and the inconvenience to customers and lack of attractiveness likewise is a deterrent to sales. The limitations on the size of the cabinet and the extent of display that can be provided in the case of a conventional cabinet for frozen food present a serious problem, for in any store floor space is at a premium. Moreover, the fact that the cabinets are left open during the day results in large losses of refrigerated atmosphere and resulting low efficiency as regards refrigeration. Another disadvantage of cabinets of the type mentioned is that in order to be low enough to permit shoppers to reach into them the amount of packaged frozen food which can be stored within the merchandising area of a store is very limited. In order to provide adequate storage room it is usual practice to provide a separate storage compartment and a refrigerating unit therefor with resultant inefficiency both mechanically in providing the refrigerated space and as regards store personnel. In such case the refrigeration losses are much greater and store employees have to make trips from the separate storage compartment outside of the merchandising area to the display cabinet within the merchandising area in order to replenish such supplies of packaged frozen food as may become depleted from time to time.

It is an object of this invention to provide an improved cabinet for merchandising packages of frozen food. More particular objects of my invention are to provide a storage cabinet for frozen food which is normally maintained covered except for a relatively small display area for each item of the packaged frozen food offered for sale. A further object of this invention is to provide a storage cabinet which is of such capacity that relatively large supplies of frozen food may be maintained within the merchandising area of a store, thus eliminating the necessity for a separate storage compartment outside of the merchandising area. A further object of this invention is to provide a cabinet for merchandising packages of frozen food which is adapted to display a very substantially increased number of frozen food items for a given amount of floor space as compared with cabinets heretofore used. Still further objects of this invention are to provide a cabinet for merchandising frozen food wherein the packaged items are more readily observable and accessible to purchasers as compared with cabinets heretofore used and wherein the display is automatically maintained in a predetermined neat and orderly condition.

Certain features and advantages of this invention relate to the provision of a storage compartment for storing packages of frozen food which is provided with a cover and which has disposed in the upper portion thereof rack means for supporting a plurality of rows of frozen food, each of which has a display area protruding beyond the cover means and as to each of which there is means whereby a package may be advanced into the display area when a package in a display area is removed by a customer.

Further features and advantages of this invention relate to the refrigeration means employed whereby, among other things, a common body of refrigerated atmosphere is maintained not only in the portion of the compartment where packages are stored, but also in the portion thereof wherein the packages are supported by the rack means and whereby refrigerated atmosphere is moved as a blanket through suitably controlled vent means over such packages as are in the uncovered display area. Moreover, such refrigerated air is retrieved and the refrigeration reintroduced into the system.

Further features and advantages of this invention relate to means employed whereby a customer may pick up a package from the display area and replace it in the display area after inspection, such ready replaceability being a substantial factor in inducing sales. The cabinet likewise is such that the packages are readily observable and easy to pick up for inspection and purchase.

Further features and advantages of this invention relate to means employed for minimizing the possibility of packages becoming frozen to the rack means, thereby permitting simple gravity means for advancing the packages in the rows supported by the rack means. Another feature and advantage of this invention is that all package handling by store personnel occurs at the rear of the cabinet, thereby at all times leaving the front of the cabinet accessible to purchasers.

Further features and advantages of this invention will be apparent from the following description of a typical embodiment of this invention that is shown for purposes of illustration in the accompanying drawings, wherein:

Fig. 2 is a sectional elevation of the cabinet shown in Fig. 1;

Fig. 3 is a front view of the cabinet;

Fig. 4 is a perspective view of certain of the elements comprised in the rack means for supporting the packages of frozen food disposed in rows;

Fig. 5 is a detail elevation partly in section and on a larger scale of the display ends of the upper two tiers of the rack means; and Fig. 6 is a detail elevation partly in section of the display end of one of the tiers showing an alternative construction.

Figure 1:
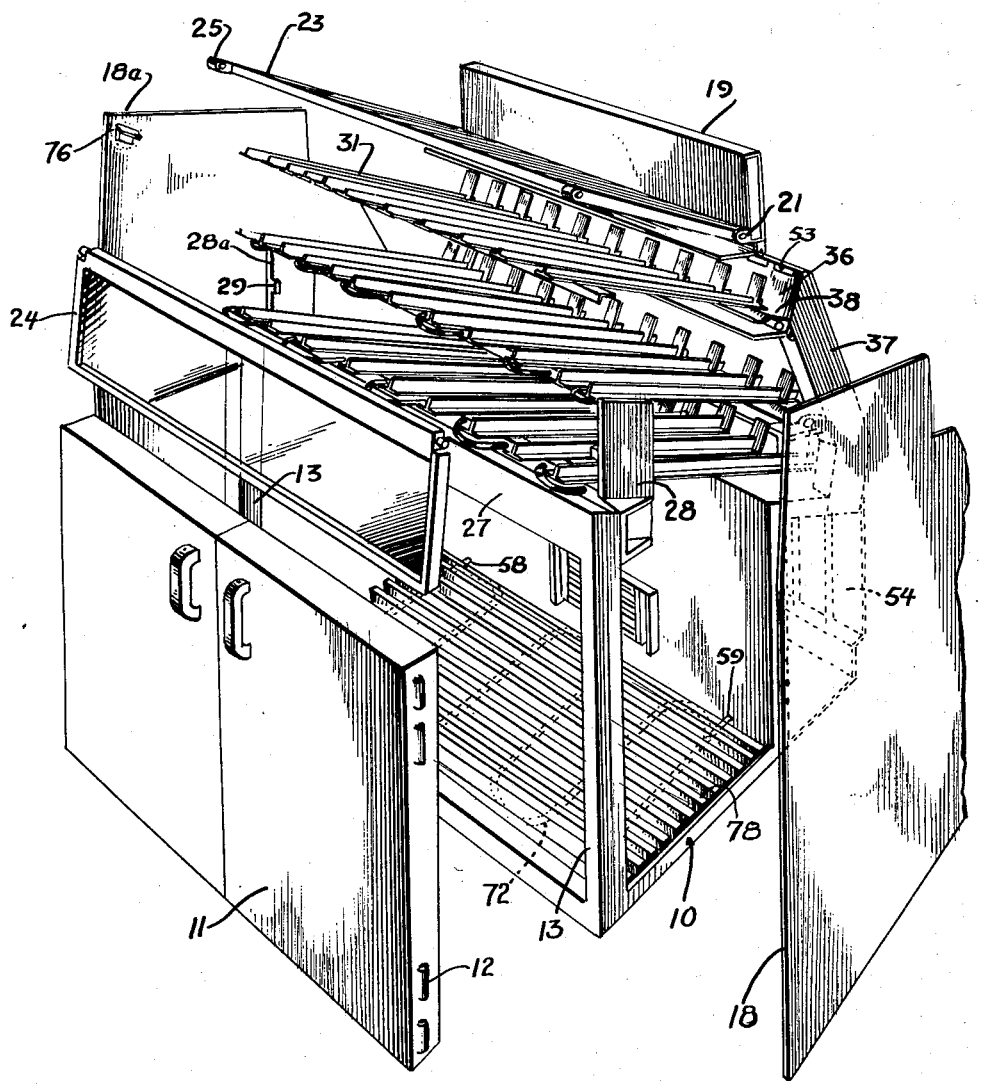
Fig. 1 is a perspective view of the cabinet as viewed from the rear, several of the parts being in separated relation so as to more clearly show the structural features of the cabinet.

The embodiment of this invention shown in the accompanying drawings is in the form of a self-contained refrigerated unit adapted both for the storage and for the display of packages of frozen food. The unit as shown is made in a size which can be readily handled and installed in a store and the form of each unit is such that, if desired, a plurality of the units may be disposed end to end, thus making possible any desired capacity for merchandising packaged frozen food as may be desired for a particular store.

The principal structure determining portion of the cabinet is provided by the frame 10. The rear of the storage compartment of the cabinet is made accessible by the doors 11, which are hingedly supported by hinge elements 12 to the posts 13 comprised in the frame 10. The doors 11 and such other wall areas as desired may be provided with a suitable thickness of heat insulation material 14. The bottom 15 of the storage compartment, the front wall 16 thereof and the shelf 17 may be constructed in any suitable way, as by the use of sheet metal covered with a suitable thickness of the heat insulation material 14. The ends of the cabinet are provided by the panels 18 and 18a which may be of sheet metal and which may or may not be covered with heat insulation material, depending upon whether or not several of the units are placed end to end in a battery. The panels 18 may be attached to the frame 10 in any suitable way as by welding.

A transverse frame element 19 is secured at each end as by welding to the panels 18 and 18a and this frame element may advantageously be made in the form of an upstanding panel wherein, for example, translucent pictures 20 of frozen food may be placed with suitable light source means 77 behind them for providing an attractive advertising panel above the cabinet at approximately eye level. If desired, one or more shelves may be placed above the frame element 19 for disposing non-frozen items so as to be observable by and accessible to purchasers.

The cover means for the storage compartment is hingedly secured to the frame element 19 by the hinge means 21. The cover means is indicated generally by the reference character 22 and in the embodiment shown comprises the inclined panel 23 and the substantially vertically disposed panel 24 that is hingedly secured to the extremity of panel 23 by the hinge means 25. The panel 23 normally rests on support brackets 76 attached to the end panels 18 and 18a respectively. The panel 24 normally rests in the support pocket 26 as shown in Fig. 2. However, if it is desired to uncover the upper portion of the compartment this can be readily accomplished by moving the panel 24 upwardly with resultant pivotal movement of the panel 23 about the hinge 21 and the movement of the panel 24 into closer proximity with panel 23 until the panel 23 becomes disposed in substantially vertically disposed position or until the panel 24 may be rested on the brackets 76, thereby uncovering the upper portion of the storage compartment of the cabinet.

In the upper portion of the storage compartment laterally disposed rack means is provided for supporting packages of frozen food in a plurality of rows extending from adjacent the back of the cabinet to adjacent the front of the cabinet. The rack means preferably is such as to provide inclined chutes extending from adjacent the rear of the cabinet to adjacent the front of the cabinet where there is a display area protruding beyond the cover means 22. Preferably the rack means is disposed in a plurality of tiers such as the three tiers shown for purposes of illustration in the drawings.

With further reference to the rack means, preferred construction has been shown as comprising the horizontally disposed frame member 27 which is comprised in the frame 10. The upstanding posts 28 and 28a which are rigidly mounted on the frame 10 adjacent each end of the cabinet are provided with supporting lugs 29 or the like for supporting the horizontally disposed angle bars 30. The rearward ends of the rails 31 rest on the angle bars 30 and their position relative thereto is fixed by the lug 32 protruding downwardly from each rail 31, which lug is adapted to fit within any of the openings 33 in the upper horizontal portion of each of the angle bars 30. This permits the spacing between the rails 31 to be selected as desired and the upstanding portions 34 of the rails provide the side walls of chutes for packages of frozen food supported between them by the horizontal portions 35 of the rails 31, which are upturned at their extremity so as to reduce the area of contact with the packages of frozen food and thereby minimize friction between the packages and the rails.

At the forward end of each tier of the rack means there is member 36 that preferably is in the form of a hollow duct and one end or the other, or both as shown, of each of the ducts 36 is secured to a manifold duct 37 which opens into the region below the shelf 17 for purposes that will be described more in detail hereinbelow. The manifold ducts 37 are secured to the end panels 18 and 18a as by welding so that the manifold ducts 37 and the ducts 36 are held in place in the cabinet structure.

Secured to each duct member 36 and extending rearwardly therefrom is the transverse bar 38 which supports the forward end of each of the rails 31. The bars 38 are provided with holes 39 into which the downwardly protruding lug 40 of each rail may be inserted for maintaining the forward end of each rail in position while permitting lateral adjustment as regards the spacing between the rails in the manner and for the purposes hereinabove mentioned in connection with the foregoing description for supporting the rearward ends of the rails 31. Each of the bars 38 comprises the reversely curved extremity 41 which is disposed for supporting the forward end of the refrigerating coil 42. The rearward end of the coil 42 may be supported by the bar member 30 in any suitable way such as that clearly disclosed in Fig. 4.

Disposed within the recess underneath the extremity 41 having the reverse curve therein there preferably is disposed light means 43 such as a tube of the glowing vapor type. The light means 43 provides means for illuminating packages in the display area so that the display may be more readily observed by prospective purchasers. The light means 77 provides illumination for the packages in the display area of the uppermost tier.

The refrigeration means used for refrigerating the contents of the cabinet of this invention may be of any conventional construction and many suitable types of refrigerating equipment are well known. In the drawings the refrigerating apparatus has been merely indicated schematically as comprising the motor 44, the compressor 45 operatively connected to the motor, and the air propelling fan 46 which likewise is operatively connected to the motor 44. These mechanisms may be conveniently disposed beneath the shelf 17 of the cabinet. Spaced substantially from the underside of the shelf 17 there is the partition 47 below which there is disposed the heat exchange unit 48 which may be of the conventional fin radiator type whereby a moving stream of air may be brought into out-of-contact heat exchange relation with compressed refrigerant to cool it and, ordinarily, condense it. Compressed refrigerant may be directed from the compressor 45 to the heat exchange unit 48 by the line 49.

In the region of the air propelling fan 46 there is a vertically disposed partition 50 having the aperture 51 therein corresponding approximately to the diameter of the fan blades. With the parts thus arranged, rotation of the fan 46 to propel air toward the right, as viewed in Fig. 3, causes the air to pass through the heat exchanger 48 so as to remove heat from the refrigerant, and the air is exhausted out of the unit through the grille 52. As aforesaid, the ducts 36 are secured to and are in communication with the manifold ducts 37 which open into the region of the cabinet below the shelf 17 that is above the partition 47. It is apparent, therefore, that the operation of the air propelling fan 46 will cause air to be drawn into the ducts 36 through the inlet openings 53. The lower portion of the front of the cabinet is provided with the front wall 54.

The refrigerant which has been compressed and cooled may be released through the pressure relief valve means which is indicated diagrammatically at 55 in the line 56. The chilled refrigerant may be directed to a refrigerating coil 72 in the bottom of the storage compartment through the lines 57 and 58 and returned to the compressor by the line 59. The coil 72 preferably is protected by the open grid 78 upon which packages of frozen food to be stored are placed. The refrigerant may be directed to the refrigerating coils 42, which are immediately subjacent with respect to the rows of packages carried by the rack means, by the lines 57 and 73, the spent refrigerant being returned to the compressor 45 by the lines 74 and 60.

In an opening in the wall 16 of the storage compartment there is disposed another refrigerating coil 61 to which refrigerant may be directed by the line 62, spent refrigerant being returned to the compressor by the lines 63 and 60. In the line of direction of the column of air propelled by the air propelling fan 46 there is a baffle or scoop 75 which deflects part of the column of air so as to pass through the opening in the wall 16 in heat exchange relationship with the refrigerating coil 61 which may be comprised in a fin type radiator or the like. By this construction refrigerated air is moved into the storage compartment and the refrigeration afforded thereby supplements that produced by the refrigerating coils within the storage compartment. Moreover, when the cover means 22 of the compartment is closed, the movement of the refrigerated air into the storage compartment causes a corresponding amount of air to be vented from the compartment and venting of the refrigerated air is caused to occur at the rearward end of the display area of each tier of rack means, with the result that a blanket of refrigerated air is caused to move out of the compartment and over any package or packages in the display areas.

The air so moved out over the display areas is retrieved due to the fact that at the forward end of each of the display areas a considerably greater amount of air is sucked into the ducts 36. So as to minimize the amount of refrigerated air which is deflected from the display area into the general atmosphere surrounding the cabinet the vent means preferably is such as to cause the air to move outwardly in general parallelism with the rack means for essentially unobstructed straight line travel from the vent means to the inlet means of the ducts 36. In order to better control the direction of air movement the vanes 64 are preferably employed which are adjustably held by hinged brackets 65 adjacent each end of the ducts 36 and which can be manually adjusted so as to provide the desired clearance with respect to the particular packages supported by the rack means. The vanes 64 may be made of Plexiglas so as not to interfere with the illumination of the packages of the display area. The passages in which the respective vanes 64 at the rear of the display areas are located and through which refrigerated air passes from the confinement of the enclosure into the respective display areas and over packages supported by the rack means in said areas constitute vent means, as this term is used herein and in the claims, for venting refrigerated air from the enclosure.

One type of stop means at the forward end of each row of packages supported by the rack means is shown in Figs. 1–5, namely, the upstanding stop member 66 which is secured to each of the rail members adjacent the forward end thereof. Each of the stop members 66 is spaced substantially from the duct 36 so as to facilitate the grasping of a package of frozen food by a prospective purchaser and make the packages in the display area more readily observable in their entirety. The individual packages of frozen food as supported in rows by the rack means are indicated by the reference character 67 and it is to be noted that the stop member 66 is proportioned so as to extend substantially above the foremost package 67 that is directly supported by the rails 31. Referring to Fig. 5, the packages of frozen food ordinarily are disposed in the uncovered display area in the manner shown in solid lines. However, if a customer wishes to examine one of them the package can be replaced in the display area in the position shown in dotted lines in Fig. 5. Thus, notwithstanding the fact that the packages are supported in rows disposed in inclined chutes so that when the foremost package is removed the rest of the packages in the row advance until the next succeeding package strikes the stop means, the advantage of this type of display mechanism whereby a package is always conveniently accessible and displayed in an orderly manner in a display area is obtained while at the same time permitting the customer to replace a package which has been removed for examination. It is important in any merchandising device that prospective customers be enabled to pick up a package and replace it if it is not desired and the structure of this invention permits this to be done without the necessity for returning the replaced package to the main storage compartment. It is also to be noted by reference to Fig. 5 that the vent means for the refrigerated air which is caused to move out of the compartment and the inlet for the ducts 36 are so disposed that the blanket of refrigerated air will flow unobstructedly in essentially a straight line from the vent means over the replaced package to the inlet 53 of the duct 36.

Normally packages of frozen food will tend to advance toward the stop member at the end of each of the downwardly inclined chutes. In some instances the friction will be rolling friction, as in the case of canned goods. In other instances the friction will be sliding friction as, for example, in the case of conventional boxes of rectangular cross-section. In order to minimize the possibility of such packages sticking to the rails 31 the surfaces in contact with the package may be coated with compounds which tend to minimize the adhesion of ice thereto. However, in the event packages are merchandised which have an excessive tendency to stick to the rails due to their becoming frozen thereto, such tendency may be counteracted by continuously maintaining relative movement between the packages and the surfaces of the rack means in contact therewith. One type of mechanism for providing such relative movement is shown in Fig. 6. Referring to the embodiment of this invention shown in Fig. 6, the stop means at the forward end of each row is provided by a cam 68 which is eccentrically mounted on a shaft 69 that is rotatably mounted and has associated therewith suitable means such as a motor (not shown) for causing continuous rotation of the shaft and of the cam 68. Upon rotation of the cam 38 it is apparent that the packages 67 supported by the rails 31 will be continuously reciprocated longitudinally with respect to the rails 31 so that no opportunity is afforded for the packages becoming adherent to the rails 31 by becoming frozen thereto and if the rotation is slow the movement of the packages of frozen food will not be apparent to customers. When the embodiment shown in Fig. 6 is employed the duct 36 provides holding means for holding a package 67 which is shown in dotted lines in Fig. 6 and which has been replaced in the display area after having been removed for inspection. In order that the replaced packages may become disposed in an orderly way in the display area, the vertical rib portion of the rail 31 preferably is provided with the terminal portion 79 of greater height adapted to control the sideward disposition of a replaced package with reference to the row from which it was taken. This feature may likewise be employed in the embodiment shown in Figs. 1 to 5.

In connection with the foregoing, the utility and operation of the cabinet are believed to be apparent. Thus the portion of the refrigerated compartment below the rack means provides a large storage reservoir for packages of frozen food. This same compartment which provides the storage reservoir also provides a covered refrigerated space for the packages of frozen food which have been placed on the rack means so as to automatically become advanced into the display area at the forward end of each tier of the rack means. By providing a plurality of tiers, approximately three times the amount of display for a given area of floor space may be provided as compared with the conventional type of frozen food cabinet of the character hereinabove referred to. Notwithstanding the greater display areas, the compartment is enclosed except for the vents to the display areas, and by the use of the covered compartment and the disposition within the storage compartment of the packages placed in the chutes for entry into the display areas, as well as the provision of large display area using, however, only a relatively small amount of floor space. Moreover, because of the large storage capacity of the compartment a separate storage space may be dispensed with.

The panel member 24 preferably is made of transparent material such as Plexiglas so that the supply of packages in the various chutes provided by the rack means may be readily observed. Whenever the supply needs to be replaced in any of the chutes the cover means 22 and the doors 11 may be opened so that the chutes may be readily filled from the back without any interference with customers in front of the cabinet. If desired, the refrigerating unit may be automatically stopped when the cover means 22 is opened and automatically started again when it is closed again.

Suitable control for the refrigeration can be obtained in any manner desired as, for example, under the control of a thermostat, as is conventional. The compressor unit may be operated continuously under variable speeds or at alternate slow and high speeds, depending upon demand. Moreover, if desired, the main refrigerating coils in the refrigerated compartment may be caused to function intermittently while the coil 61 is caused to function continuously together with the circulation of the air to provide the continuously flowing blanket of refrigerated air over packages in the display areas. A valve for effecting such intermittent control has been indicated diagrammatically at 70. The flow of air through the cabinet may likewise be controlled. Thus, the opening in the wall 16 may be controlled by the louvers 71 and similar louvers may be used in conjunction with the grille 52 so that the relative amount of air passed through the opening in the wall 16 and through the grille 52 may be controlled as desired, and these controls, as supplemented by the adjustable vanes 64, provide means for adjusting the most desirable amount of refrigerated air that is caused to flow over the packages in the display area.

While this invention has been described in connection with a typical embodiment thereof, it is to be understood that this has been done for illustrative purposes and that variations may be made in the structure while utilizing features of this invention as hereinabove described. Thus, instead of using the single fan 46 two fans may be employed, one for moving air through the heat exchanger 48 to cool the compressed refrigerant and the other being used to move air through the cooling coil 61 in the opening in the wall 16 of the refrigerated compartment of the cabinet. In such case all of the air drawn into the ducts 36 may be caused to be recirculated into the refrigerated compartment of the cabinet, so as to conserve the refrigeration in this way. However, when the single fan is employed the refrigeration likewise is conserved due to the greater temperature differential that is maintained at the heat exchanger 48. It is also possible in the practice of this invention to employ readily removable transparent covers over the display areas which can be opened by prospective purchasers in taking out a package. In such case the means for moving refrigerated atmosphere from the refrigerated compartment out over the packages in the display areas may be dispensed with. However, the construction shown in the drawings is regarded as preferable from the point of view of customer preference.

I claim:

1. A cabinet for merchandising packages of frozen food which comprises a compartment adapted for the storage of packages of frozen food therein, a cover for said compartment, rack means laterally disposed in the upper portion of said compartment adapted to support a plurality of rows one above the other of packages of frozen food each of which rows extends from adjacent the rear of said compartment to adjacent the front of said compartment and extends beyond said cover for disposing packages supported by the forward end of said rack means in position displayed and accessible to purchasers, and said rack means being adapted to receive packages of frozen food at the rearward end thereof and being inclined and adapted for advancement by gravity of packages supported by said rack means forwardly from the rear end of each row to replace any packages removed from the forward end of the row, closure means at the rear of said compartment mounted for ready removal to provide access to packages stored in said compartment and to the rear end of said rack means, packages stored in said compartment below said rack means and packages supported by said rack means being in contact with a common body of atmosphere, and means for refrigerating said common body of atmosphere comprising refrigerating coils disposed immediately subjacent packages supported by said rack means for each of said rows.

2. A cabinet for merchandising packages of frozen food which comprises a compartment adapted for the storage of packages of frozen food therein, inclined rack means laterally disposed in the upper portion of said compartment adapted to support a plurality of rows one above the other of packages of frozen food each of which rows extends from adjacent the rear of the compartment downwardly to adjacent the front of said compartment, said rack means being adapted and arranged to provide at an adjacent forward end thereof a display area wherein the packages are accessible to purchasers and to receive packages of frozen food at the rearward end of said rows, cover means for covering said rack means rearwardly of said display area, removable closure means at the rear of said compartment providing access to packages of frozen food stored below said rack means in said compartment, removable closure means at the rear of said compartment providing access to the rear of said rack means, and means for refrigerating said compartment comprising refrigerating coils disposed immediately subjacently to packages supported by said rack means for each of said rows and extending into said display area.

3. A cabinet for merchandising packages of frozen food which comprises a compartment adapted for storing packages of frozen food, rack means in the upper portion of the compartment disposed in a plurality of laterally disposed tiers, each tier being adapted to support a plurality of rows of packages of frozen food that are inclined downwardly from adjacent the rear of the compartment to the front of the compartment, the forward end of each tier being constructed and arranged to provide a display area observable by and accessible to purchasers with the display area of an overlying tier set back from an underlying tier, refrigerating coil means within the lower portion of said compartment, refrigerating coil means subjacent with respect to each of said tiers, cover means disposed over the uppermost of said tiers and disposed rearwardly from the display area of said tier for confining refrigerated atmosphere within said compartment and disposed about packages stored in said compartment and supported by said tiers of said rack means, duct means adjacent the forward extremity of each tier for receiving refrigerated air and directing same laterally to at least one end of said cabinet and thence into said compartment, and air-propelling means for positively propelling refrigerated air so as to be drawn into and through said duct means as so directed.

4. A cabinet for merchandising packages of frozen food which comprises a compartment adapted for storing packages of frozen food, rack means in the upper portion of said compartment disposed in a plurality of tiers, each tier being adapted to support a plurality of rows of packages of frozen food that are inclined downwardly from adjacent the rear of the compartment to adjacent the front of the compartment, the forward end of each tier being constructed and arranged to provide an uncovered display area with the display area of an overlying tier set back with respect to an underlying tier, cover means for confining atmosphere about the packages in said compartment supported by said rows rearwardly of said display areas, air-propelling means for causing movement of atmosphere about said packages supported by said rack means from within said compartment out over packages in said display areas, means for refrigerating the atmosphere that is in said compartment and that is moved out over the packages in said display areas, cam-shaped stop means at the front of each tier against which the foremost package of each row abuts, means for rotating said cam means to impart a reciprocating motion to each row of packages relative to the rack means supporting same, said rack means being inclined for causing the row of packages to normally remain in continuous contact with said cam means, holding means for holding a package placed on top of of the foremost package in each row, said means at the forward end of each tier having air inlet means that is disposed adjacent the forward end of each row of packages supported by said rack means and that is disposed substantially above the level of the top of a package held by said holding means on top of said foremost package, means operatively connected to said air-propelling means for drawing air into said duct means, means for returning into said compartment at least part of the refrigeration comprised in air drawn into said ducts, and means comprising adjustable vane means for directing refrigerated atmosphere so as to move out of said compartment in a stream directed toward said air inlet means.

5. A cabinet according to claim 4 which comprises means for directing part of the air that is drawn into said duct means by said air-propelling means into out-of-contact heat exchange with compressed refrigerant to remove heat therefrom and another part of said air into out-of-contact heat exchange relation with expanded refrigerant to have heat removed therefrom and thence into said compartment.

6. A cabinet of the character described for merchandising packages of frozen food which comprises rack means adapted to support a row of packages of frozen food so as to slope downwardly from adjacent the rear of said cabinet to adjacent the front of said cabinet, means for refrigerating packages supported by said rack means, a stop member against which the foremost package is adapted to abut, and means for reciprocating said stop member slowly and substantially uninterruptedly relative to said rack means and substantially in line therewith for reciprocating a row of packages supported by said rack means relative thereto, the region above said rack means adjacent said stop means being a display area for packages supported by said rack means in position accessible to customers.

7. A cabinet for merchandising packages of frozen food which comprises rack means adapted to support a row of packages from adjacent the rear of the cabinet to adjacent the front of the cabinet, enclosure means for enclosing said rack means and packages supported thereby in a body of atmosphere confined by said enclosure means, the forward end of said rack means protruding from said enclosure means for the display of at least one package in an uncovered display area, means for moving air into said enclosure means, means for refrigerating air moved into said enclosure means, and vent means which is at the forward end of said enclosure means in close proximity to packages supported by said rack means for venting refrigerated air from said enclosure means so as to pass over said packages in said display area and which is adjustable for adjustably controlling the direction of flow of refrigerated air therefrom in relation to the upper surfaces of said packages in said display area, and adjustable vane means for adjustably controlling the direction of flow of refrigerated air in relation to the upper surfaces of said packages in said display area.

8. A cabinet for merchandising packages of frozen food which comprises rack means adapted to support a row of packages from adjacent the rear of the cabinet to adjacent the front of the cabinet, enclosure means for enclosing the major portion of said rack means and packages supported thereby in a body of atmosphere confined by said enclosure means, the forward end of said rack means protruding from said enclosure means for the display of at least one package in an uncovered display area, and said rack means being inclined and adapted for advancement by gravity of packages in said row to replace a package removed from said display area by a customer, means for moving air into said enclosure means, means for refrigerating air moved into said enclosure means, air vent means at the forward end of said enclosure means for venting refrigerated air from said enclosure means so as to have substantially unidirectional flow passing over said package in said display area, an air duct at the forward end of said display area having an inlet aperture substantially spaced from said vent means and substantially in alignment with the direction of flow of refrigerated air emerging from said vent means for receiving said refrigerated air, air propelling means for drawing air into said duct means, a heat exchanger for indirectly contacting compressed refrigerant with air to remove heat therefrom and means for directing at least part of the air drawn into said said air duct in out-of-contact heat exchange with compressed refrigerant in said heat exchanger.

9. A cabinet according to claim 8 which comprises means for adjusting the rate at which air is drawn into said duct means relative to the rate of movement of air moved into said enclosure means.

References Cited in the file of this patent

UNITED STATES PATENTS

| 2,130,089 | Hull | Sept. 13, 1938 |
| 2,154,466 | Morrison | Apr. 18, 1939 |
| 2,200,228 | Simmons | May 7, 1940 |
| 2,450,088 | Henderson | Sept. 28, 1948 |
| 2,453,280 | Stewart | Nov. 9, 1948 |
| 2,466,286 | Stultz | Apr. 5, 1949 |
| 2,481,790 | Spiro | Sept. 13, 1949 |
| 2,495,554 | Spangler | Jan. 24, 1950 |
| 2,499,089 | Brill et al. | Feb. 28, 1950 |
| 2,529,470 | Johnson | Nov. 7, 1950 |
| 2,584,628 | Skillman | Feb. 5, 1952 |
| 2,606,803 | Whelan | Aug. 12, 1952 |
| 2,635,434 | Bently | Apr. 21, 1953 |
| 2,641,112 | Muffly | June 9, 1953 |
| 2,679,143 | Helsing | May 25, 1954 |
| 2,713,995 | Arkoosh et al. | July 26, 1955 |